United States Patent
Mieir (10) Patent No.: US 11,293,740 B1
(45) Date of Patent: Apr. 5, 2022

(54) ANGLE MEASURING ASSEMBLY

(71) Applicant: Ross Mieir, Loveland, CO (US)

(72) Inventor: Ross Mieir, Loveland, CO (US)

( * ) Notice: Subject to any disclaimer, the term of this patent is extended or adjusted under 35 U.S.C. 154(b) by 1 day.

(21) Appl. No.: 17/032,143

(22) Filed: Sep. 25, 2020

(51) Int. Cl.
  *G01B 3/56* (2006.01)
  *G01B 3/00* (2006.01)
  *G01C 9/34* (2006.01)

(52) U.S. Cl.
  CPC ............. *G01B 3/563* (2013.01); *G01B 3/004* (2013.01); *G01C 9/34* (2013.01)

(58) Field of Classification Search
  CPC ....................................................... G01B 3/563
  USPC ........................................................... 33/379
  See application file for complete search history.

(56) References Cited

U.S. PATENT DOCUMENTS

| | | | |
|---|---|---|---|
| 1,828,930 A | 10/1931 | Grozi | |
| 1,983,516 A | 12/1934 | Ahola | |
| 2,023,539 A | 12/1935 | Packard | |
| 2,180,509 A | 11/1939 | Dickson | |
| 2,570,356 A | 10/1951 | Luis | |
| 3,766,652 A * | 10/1973 | Gomez | G06G 1/00 33/472 |
| 4,835,877 A | 6/1989 | Roach | |
| 5,419,053 A | 5/1995 | Kathan | |
| 5,452,522 A * | 9/1995 | Kook | B25H 7/02 33/418 |
| 6,314,652 B1 * | 11/2001 | English | G01B 5/24 33/419 |
| D460,924 S | 7/2002 | Hitchcock | |
| 7,278,217 B1 * | 10/2007 | Mills | G01B 3/563 33/276 |
| 8,826,556 B2 | 9/2014 | Roth | |
| 9,429,424 B2 * | 8/2016 | Butler | G01C 9/34 |
| 9,599,447 B2 * | 3/2017 | Cruickshanks | B43L 7/12 |
| 2005/0210688 A1 * | 9/2005 | Stephens | G09B 23/04 33/1 N |
| 2006/0213069 A1 * | 9/2006 | Martin | G01C 15/008 33/286 |

\* cited by examiner

*Primary Examiner* — George B Bennett (57) ABSTRACT

An angle measuring assembly includes a protractor that is positionable against an inclined member. The protractor has angle indicia printed thereon and pitch indicia printed thereon. A bubble level is coupled to the protractor to indicate the angle of a top surface of the inclined member. A first wand is pivotally coupled to the protractor to facilitate the user to measure cutting angles on lumber. A second wand is pivotally coupled to the protractor and the second wand is aligned with respective angle indicia and respective pitch indicia when the protractor is positioned against a bottom surface of the inclined member. In this way the second wand indicate the angle and pitch of the bottom surface.

12 Claims, 6 Drawing Sheets

ANGLE MEASURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to measuring devices and more particularly pertains to a new measuring device for measuring pitch and angle of a top or a bottom of an inclined member.

(2) Description of Related Art Including Information Disclosed Under 37 CFR 1.97 and 1.98

The prior art relates to measuring devices including a T-square that has an angle indicator pivotally coupled thereto. The prior art discloses a variety of measuring devices that each include a protractor and at least one measuring gauge being pivotally coupled to the protractor for measuring angles. The prior art discloses a framing square that has a bubble level rotatably coupled thereto for indicating degrees of inclination. The prior art discloses a variety of measuring devices that each includes a protractor and a framing square.

BRIEF SUMMARY OF THE INVENTION

An embodiment of the disclosure meets the needs presented above by generally comprising a protractor that is positionable against an inclined member. The protractor has angle indicia printed thereon and pitch indicia printed thereon. A bubble level is coupled to the protractor to indicate the angle of a top surface of the inclined member. A first wand is pivotally coupled to the protractor to facilitate the user to measure cutting angles on lumber. A second wand is pivotally coupled to the protractor and the second wand is aligned with respective angle indicia and respective pitch indicia when the protractor is positioned against a bottom surface of the inclined member. In this way the second wand indicate the angle and pitch of the bottom surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
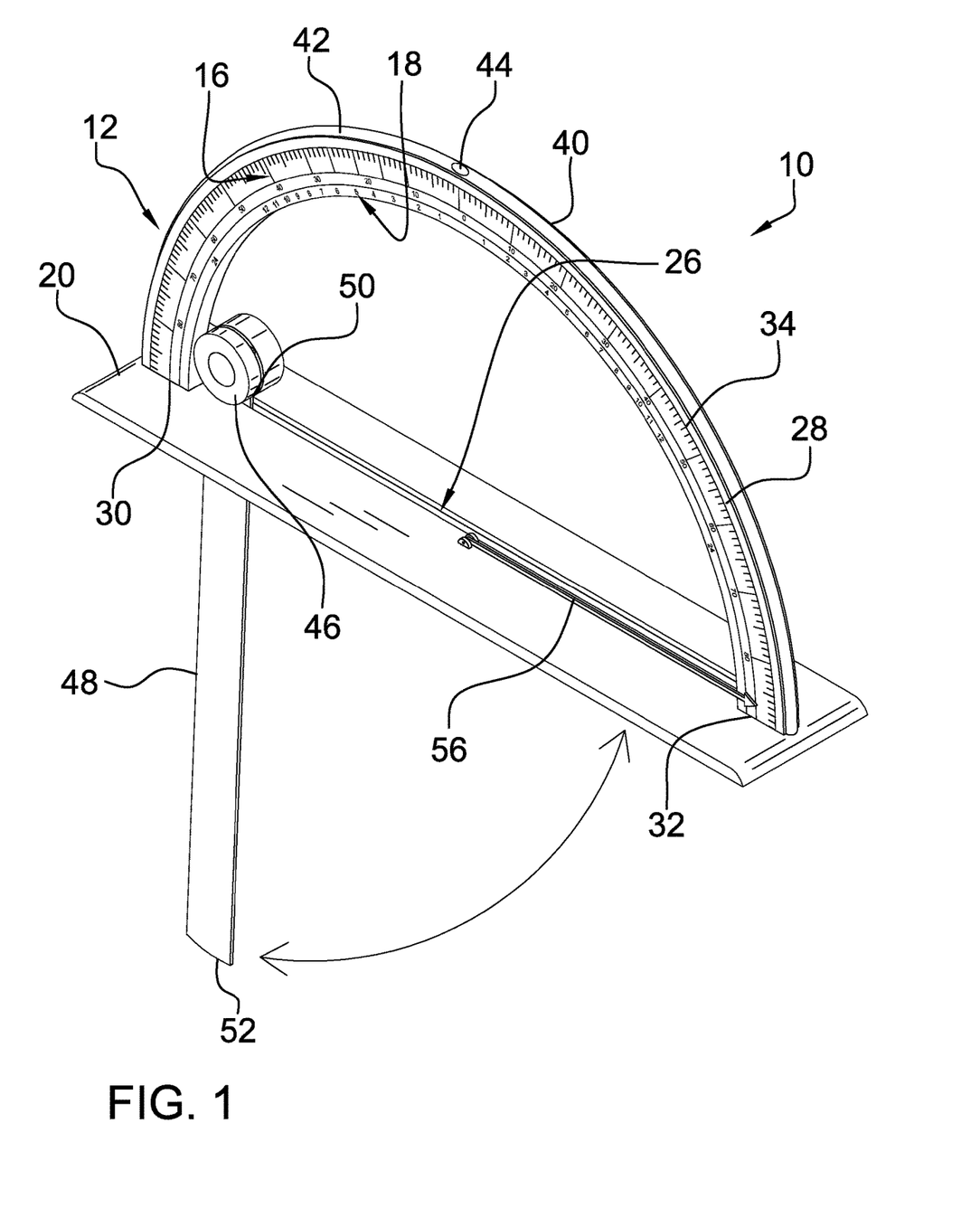
FIG. 1 is a perspective view of an angle measuring assembly according to an embodiment of the disclosure.
Figure 2:
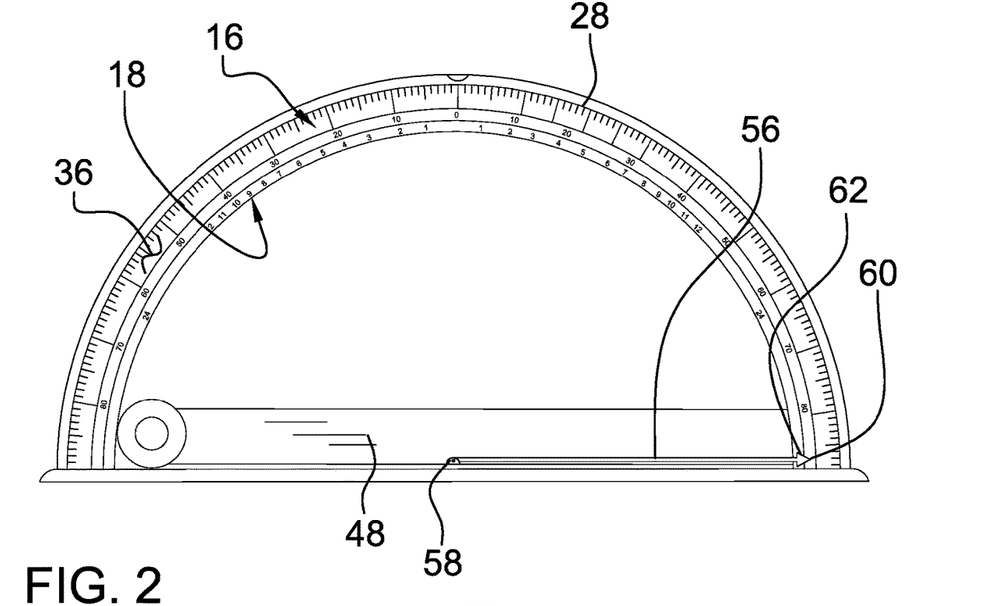
FIG. 2 is a front view of an embodiment of the disclosure.
Figure 3:
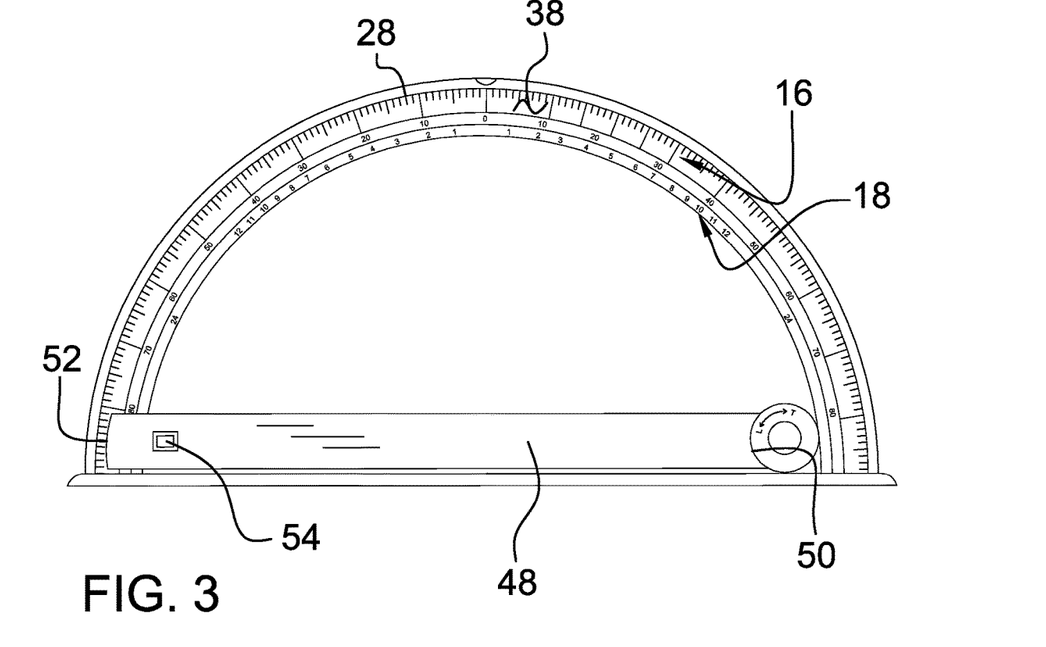
FIG. 3 is a back view of an embodiment of the disclosure.
Figure 4:
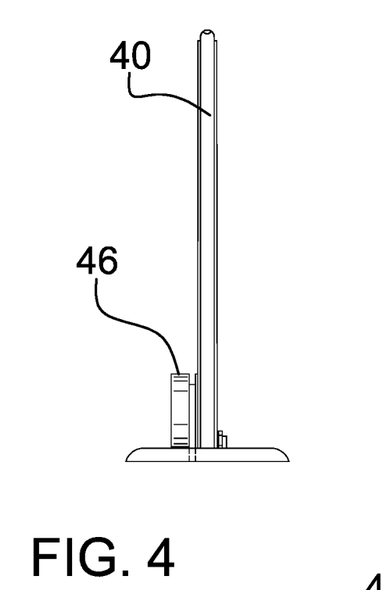
FIG. 4 is a right side view of an embodiment of the disclosure.
Figure 5:
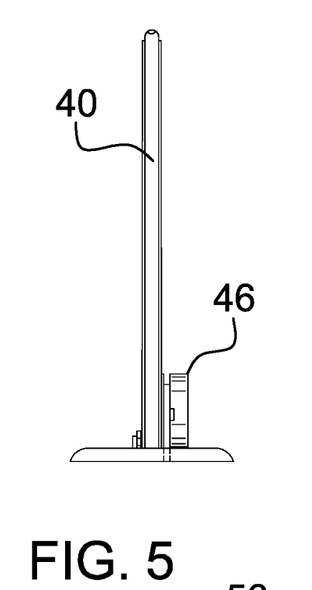
FIG. 5 is a left side view of an embodiment of the disclosure.
Figure 6:
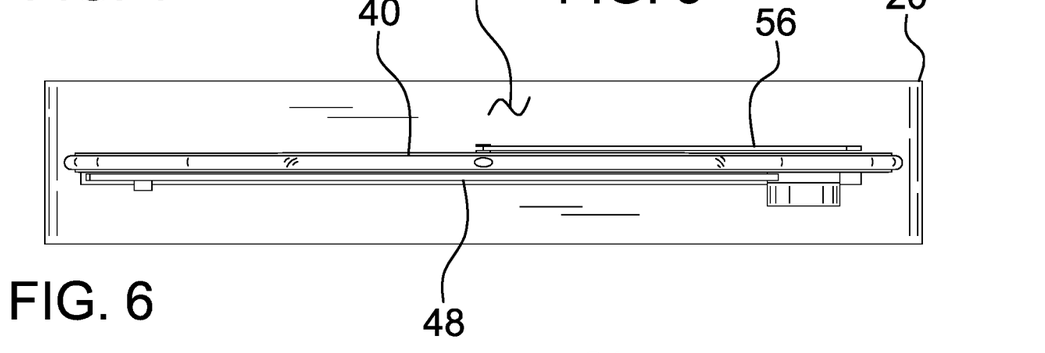
FIG. 6 is a top view of an embodiment of the disclosure.
Figure 7:
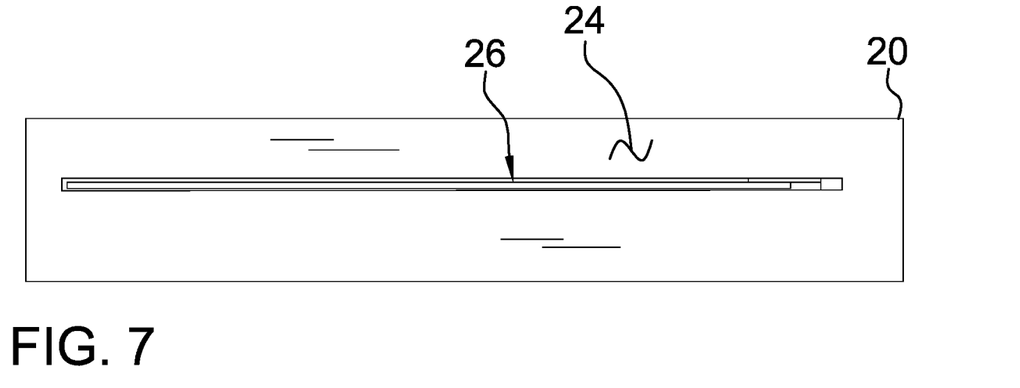
FIG. 7 is a bottom view of an embodiment of the disclosure.
Figure 8:
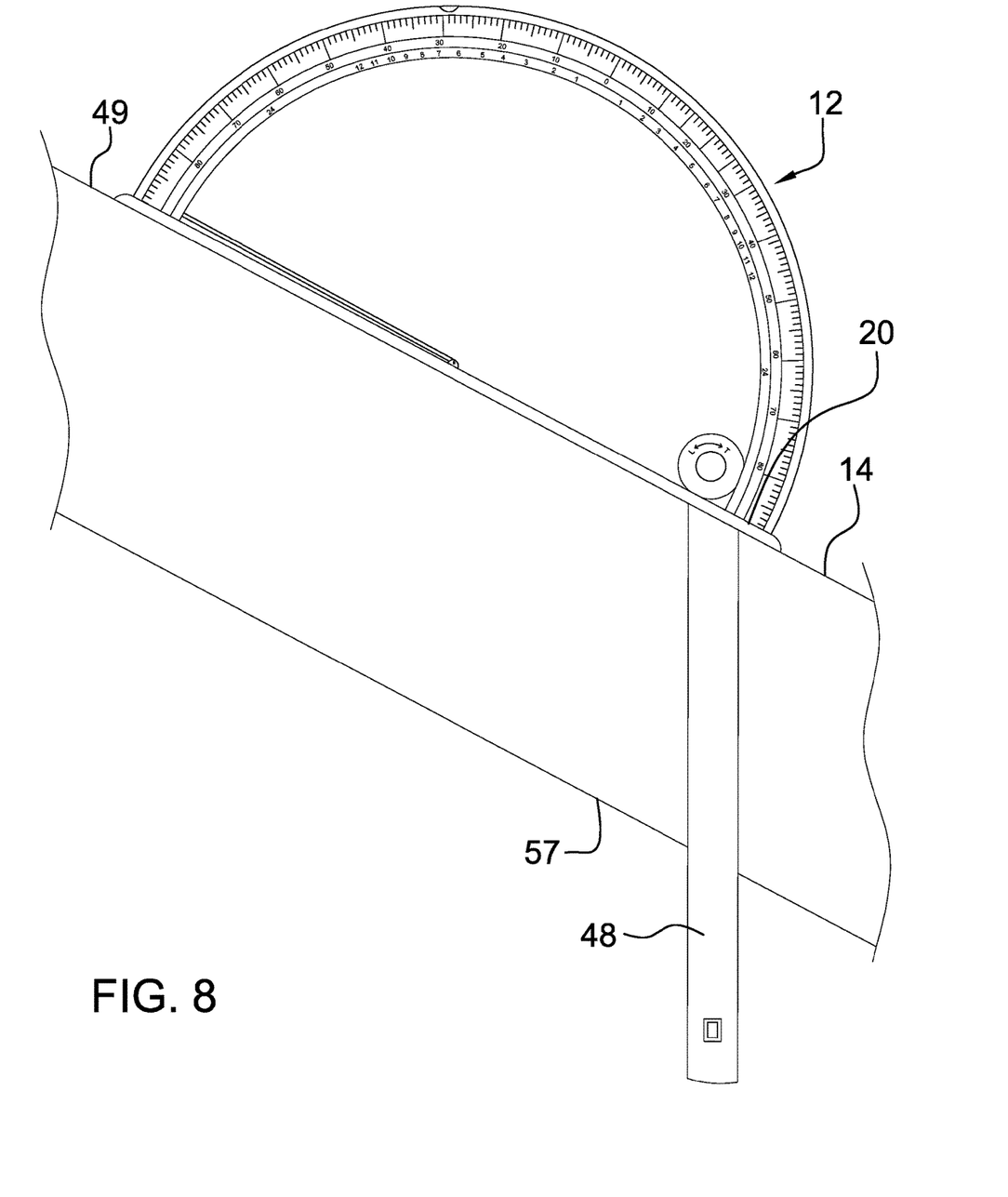
FIG. 8 is a perspective in-use view of an embodiment of the disclosure showing a protractor positioned on a top surface of an inclined member.
Figure 9:
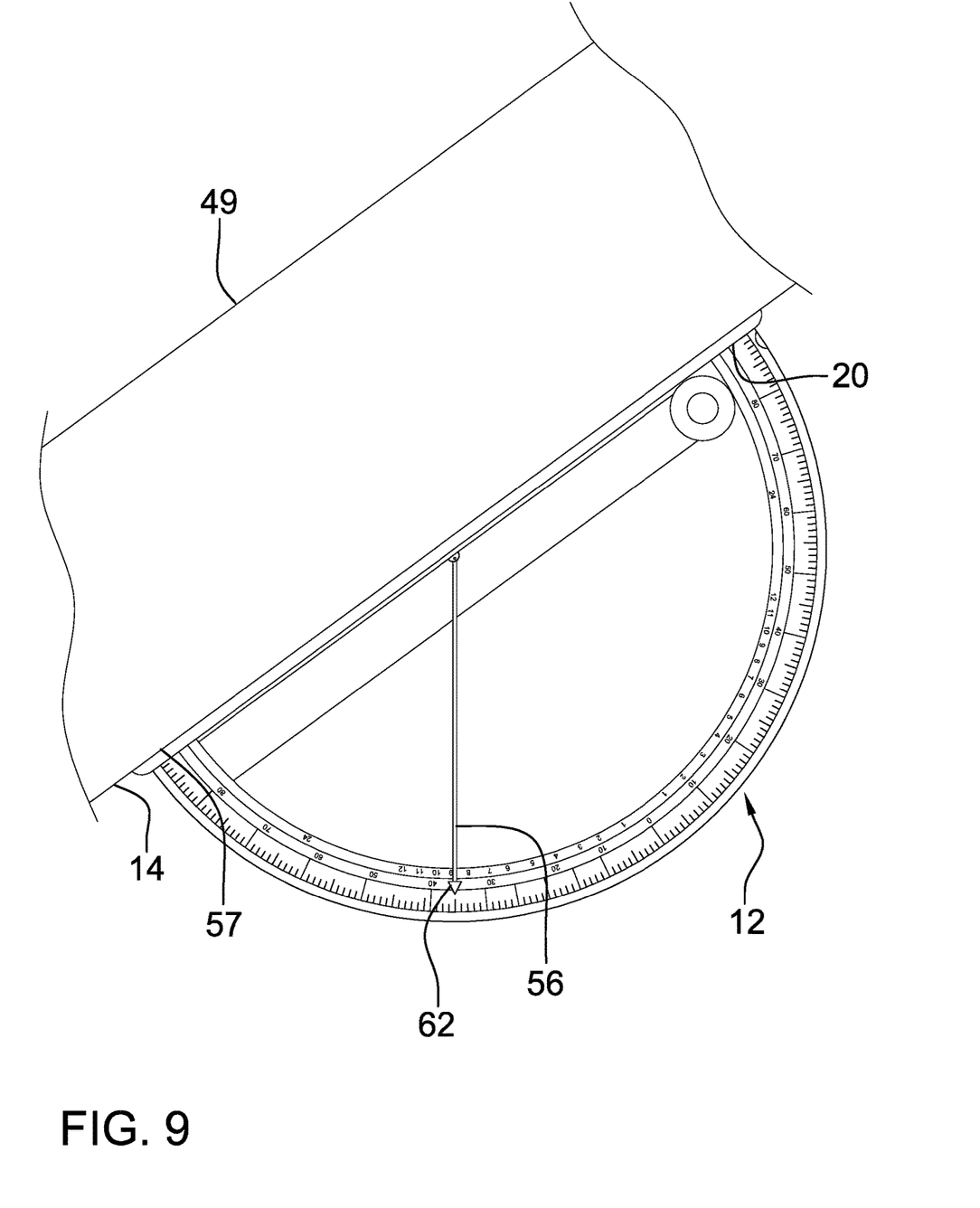
FIG. 9 is a perspective in-use view of an embodiment of the disclosure showing a protractor being positioned on a bottom surface of an inclined member.
Figure 10:
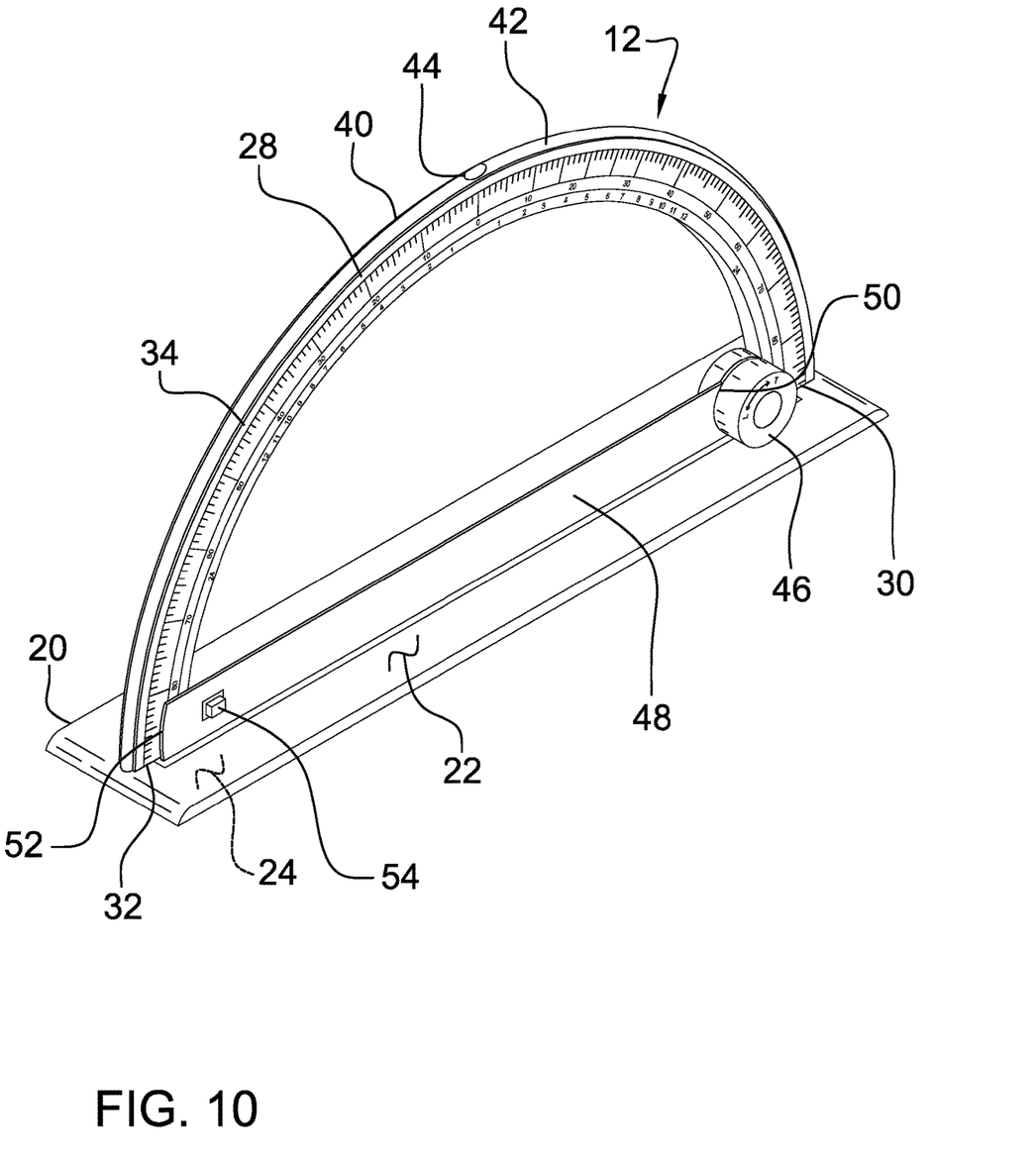
FIG. 10 is a top perspective view of an embodiment of the disclosure.

With reference now to the drawings, and in particular to FIGS. 1 through 10 thereof, a new measuring device embodying the principles and concepts of an embodiment of the disclosure and generally designated by the reference numeral 10 will be described.

As best illustrated in FIGS. 1 through 10, the angle measuring assembly 10 generally comprises a protractor 12 that is positionable against an inclined member 14. The inclined member 14 may be a roof truss, a rafter or any other member commonly employed in building construction. The protractor 12 has angle indicia 16 printed thereon comprising numbers indicating angles. Additionally, the protractor 12 has pitch indicia 18 printed thereon indicating roof pitch.

The protractor 12 includes a base 20 that has a top surface 22 and a bottom surface 24. The base 20 has a slot 26 extending through the top surface 22 and the bottom surface 24. The protractor 12 also includes an arcuate member 28 that has a first end 30, a second end 32 and an outer edge 34 extending therebetween. The arcuate member 28 has a front surface 36 and a back surface 38 each extending between the first end 30 and the second end 32. Each of the first end 30 and the second end 32 is coupled to the top surface 22 of the base 20 having the arcuate member 28 forming an arc with respect to the base 20.

The angle indicia 16 are printed on the front surface 36 and the back surface 38. The angle indicia 16 are spaced apart from each other and are distributed between the first end 30 and the second end 32 such that the angle indicia 16 defines a graduated scale for measuring angles ranging between zero degrees and ninety degrees. The pitch indicia 18 are printed on the front surface 36 and the back surface 38. The pitch indicia 18 are spaced apart from each other and are distributed along a substantial length of the arcuate member 28 to define a graduated scale. Moreover, the pitch indicia 18 are strategically positioned with respect to the angle indicia 16 thereby facilitating the pitch indicia 18 to indicate pitch of the inclined member 14.

A bubble level 40 is provided and the bubble level 40 is coupled to the protractor 12. The bubble level 40 is oriented to extend along the angle indicia 16 on the protector. In this way the bubble level 40 can indicate the angle of the inclined member 14 to a user. The bubble level 40 is positioned on the outer edge 34 of the arcuate member 28 and the bubble level 40 extends between the first end 30 and the second end 32.

The bubble level 40 is substantially filled with a liquid 42 such that an air bubble 44 is defined within the bubble level 40. The air bubble 44 travels along the outer edge 34 of the arcuate member 28 when the base 20 is positioned against the inclined member 14. In this way the air bubble 44 is aligned with respective ones of the angle indicia 16 and the pitch indicia 18 to measure the angle and the pitch of the inclined member 14. The liquid 42 may comprise a tinted anti-freeze or other type of liquid 42 that resists being frozen.

A pivot 46 is coupled to the top surface 22 of the base 20 and the pivot 46 is positioned adjacent to the first end 30 of the arcuate member 28. Additionally, the pivot 46 is tightenable or loosenable. A first wand 48 is provided and the first wand 48 is pivotally coupled to the protractor 12. The first wand 48 is suspended from the protractor 12 at a respective angle when the protractor 12 is positioned against a top surface 49 of the inclined member 14. In this way the first wand 48 facilitates the user to measure cutting angles on lumber.

The first wand 48 has a primary end 50 and a secondary end 52, and the primary end 50 is pivotally coupled to the pivot 46 having the first wand 48 being aligned with the slot 26 in the base 20. The first wand 48 passes downwardly through the slot 26 when the base 20 is positioned on the inclined member 14. The first wand 48 is inhibited from moving when the pivot 46 is tightened and the first wand 48 is facilitated to move when the pivot 46 is loosened. A lock 54 is movably integrated into the first wand 48 and the lock 54 engages the base 20 to inhibit the first wand 48 from passing through the slot 26. The lock 54 can be depressed into the first wand 48 to facilitate the first wand 48 to pass through the slot 26. Additionally, the lock 54 may be positioned adjacent to the secondary end 52 of the first wand 48.

A second wand 56 is provided and the second wand 56 is pivotally coupled to the protractor 12. The second wand 56 is suspended from the protractor 12 at a respective angle when the protractor 12 is positioned against a bottom surface 57 of the inclined member 14. The second wand 56 is aligned with respective angle indicia 16 and respective pitch indicia 18 when the protractor 12 is positioned against the bottom surface 57 of the inclined member 14. In this way the second wand 56 can indicate the angle and pitch of the bottom surface 57 of the inclined member 14 to the user.

The second wand 56 has a coupled end 58 and a free end 60, and the coupled end 58 pivotally engages the top surface 22 of the base 20 at a point that is centrally located between the first end 30 and the second end 32 of the arcuate member 28. Additionally, the free end 60 is positioned next to the front surface 36 of the arcuate member 28. The second wand 56 is suspended from the base 20 at a respective angle when the base 20 is positioned against the bottom surface 57 of the inclined member 14. In this way the free end 60 is aligned with respective angle indicia 16 and respective pitch indicia 18. The second wand 56 has a pointer 62 integrated therein and the pointer 62 tapers to a point located on the free end 60. In this way the pointer 62 enhances accuracy of the angle and pitch measurement.

In use, the base 20 is positioned on the top surface 49 of the inclined member 14 to facilitate the bubble level 40 to measure the angle and the pitch of the inclined member 14. Additionally, the pivot 46 is loosened to facilitate the first wand 48 to freely pivot 46 thereby facilitating the first wand 48 to orient itself along a vertical axis. In this way the first wand 48 can indicate a line for cutting lumber that can be joined to the inclined member 14 along a horizontal axis. The base 20 is positioned on the bottom surface 24 of the inclined member 14 when the top surface 22 of the inclined member 14 is not accessible. In this way the second wand 56 indicates the angle and the pitch of the inclined member 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An angle measuring assembly for facilitating a construction worker to measure pitch and rise of an angled member, said assembly comprising:

a protractor being positionable against an inclined member, said protractor having angle indicia being printed thereon comprising numbers indicating angles, said protractor having pitch indicia being printed thereon indicating roof pitch;

a bubble level being coupled to said protractor, said bubble level being oriented to extend along said angle indicia on said protector wherein said bubble level is configured to indicate the angle of the inclined member to a user;

a first wand being pivotally coupled to said protractor, said first wand being suspended from said protractor at a respective angle when said protractor is positioned against a top surface of the inclined member wherein said first wand is configured to facilitate the user to measure cutting angles on lumber; and a second wand being pivotally coupled to said protractor, said second wand being suspended from said protractor at a respective angle when said protractor is positioned against a bottom surface of the inclined member, said second wand being aligned with respective angle indicia and respective pitch indicia when said protractor is positioned against the bottom surface of the inclined member wherein said second wand is configured to indicate the angle and pitch of the bottom surface of the inclined member to the user.

2. The assembly according to claim 1, wherein said protractor includes a base having a top surface and a bottom surface, said base having a slot extending through said top surface and said bottom surface.

3. The assembly according to claim 2, wherein said protractor includes an arcuate member having a first end, a second end and an outer edge extending therebetween, said arcuate member having a front surface and a back surface each extending between said first end and said second end, each of said first end and said second end being coupled to said top surface of said base having said arcuate member forming an arc with respect to said base.

4. The assembly according to claim 3, wherein said angle indicia being printed on said front surface and said back surface, said angle indicia being spaced apart from each other and being distributed between said first end and said second end such that said angle indicia defines a graduated scale for measuring angles ranging between zero degrees and ninety degrees.

5. The assembly according to claim 3, wherein said pitch indicia is printed on said front surface and said back surface, said pitch indicia being spaced apart from each other and being distributed along a substantial length of said arcuate member to define a graduated scale, said pitch indicia being strategically positioned with respect to said angle indicia thereby facilitating said pitch indicia to indicate pitch of an inclined member.

6. The assembly according to claim 3, wherein said bubble level is positioned on said outer edge of said arcuate member, said bubble level extending between said first end and said second end, said bubble level being substantially filled with a liquid such that an air bubble is defined within said bubble level, said air bubble traveling along said outer edge of said arcuate member when said base is positioned against the inclined member such that said air bubble is aligned with respective ones of said angle indicia and said pitch indicia wherein said air bubble is configured to measure the angle and the pitch of the inclined member.

7. The assembly according to claim 3, further comprising a pivot being coupled to said top surface of said base, said pivot being positioned adjacent to said first end of said arcuate member, said pivot being tightenable or loosenable.

8. The assembly according to claim 7, wherein said first wand has a primary end and a secondary end, said primary end being pivotally coupled to said pivot having said first wand being aligned with said slot in said base, said first wand passing downwardly through said slot when said base is positioned on the inclined member, said first wand being inhibited from moving when said pivot is tightened, said first wand being facilitated to move when said pivot is loosened.

9. The assembly according to claim 3, wherein said second wand has a coupled end and a free end said coupled end pivotally engages said top surface of said base at a point being centrally located between said first end and said second end of said arcuate member having said free end being positioned next to said front surface of said arcuate member.

10. The assembly according to claim 9, wherein said second wand is suspended from said base at a respective angle when said base is positioned against a bottom of the inclined member thereby facilitating said free end to be aligned with respective angle indicia and respective pitch indicia.

11. The assembly according to claim 9, wherein said second wand has a pointer being integrated therein, said pointer tapering to a point located on said free end wherein said pointer is configured to enhance accuracy of the angle and pitch measurement.

12. An angle measuring assembly for facilitating a construction worker to measure pitch and rise of an angled member, said assembly comprising:

a protractor being positionable against an inclined member, said protractor having angle indicia being printed thereon comprising numbers indicating angles, said protractor having pitch indicia being printed thereon indicating roof pitch, said protractor including:

a base having a top surface and a bottom surface, said base having a slot extending through said top surface and said bottom surface; and an arcuate member having a first end, a second end and an outer edge extending therebetween, said arcuate member having a front surface and a back surface each extending between said first end and said second end, each of said first end and said second end being coupled to said top surface of said base having said arcuate member forming an arc with respect to said base, said angle indicia being printed on said front surface and said back surface, said angle indicia being spaced apart from each other and being distributed between said first end and said second end such that said angle indicia defines a graduated scale for measuring angles ranging between zero degrees and ninety degrees, said pitch indicia being printed on said front surface and said back surface, said pitch indicia being spaced apart from each other and being distributed along a substantial length of said arcuate member to define a graduated scale, said pitch indicia being strategically positioned with respect to said angle indicia thereby facilitating said pitch indicia to indicate pitch of an inclined member;

a bubble level being coupled to said protractor, said bubble level being oriented to extend along said angle indicia on said protector wherein said bubble level is configured to indicate the angle of the inclined member to a user, said bubble level being positioned on said outer edge of said arcuate member, said bubble level extending between said first end and said second end, said bubble level being substantially filled with a liquid such that an air bubble is defined within said bubble level, said air bubble traveling along said outer edge of said arcuate member when said base is positioned against the inclined member such that said air bubble is aligned with respective ones of said angle indicia and said pitch indicia wherein said air bubble is configured to measure the angle and the pitch of the inclined member;

a pivot being coupled to said top surface of said base, said pivot being positioned adjacent to said first end of said arcuate member, said pivot being tightenable or loosenable;

a first wand being pivotally coupled to said protractor, said first wand being suspended from said protractor at a respective angle when said protractor is positioned against a top surface of the inclined member wherein said first wand is configured to facilitate the user to measure cutting angles on lumber, said first wand having a primary end and a secondary end, said primary end being pivotally coupled to said pivot having said first wand being aligned with said slot in said base, said first wand passing downwardly through said slot when said base is positioned on the inclined member, said first wand being inhibited from moving when said pivot is tightened, said first wand being facilitated to move when said pivot is loosened; and a second wand being pivotally coupled to said protractor, said second wand being suspended from said protractor at a respective angle when said protractor is positioned against a bottom surface of the inclined member, said second wand being aligned with respective angle indicia and respective pitch indicia when said protractor is positioned against the bottom surface of the inclined member wherein said second wand is configured to indicate the angle and pitch of the bottom surface of the inclined member to the user, said second wand having a coupled end and a free end, said coupled end pivotally engaging said top surface of said base at a point being centrally located between said first end and said second end of said arcuate member having said free end being positioned next to said front surface of said arcuate member, said second wand being suspended from said base at a respective angle when said base is positioned against a bottom of the inclined member thereby facilitating said free end to be aligned with respective angle indicia and respective pitch indicia, said second wand having a pointer being integrated therein, said pointer tapering to a point located on said free end wherein said pointer is configured to enhance accuracy of the angle and pitch measurement.

\* \* \* \* \*